United States Patent [19]

Elderstig et al.

[11] Patent Number: 5,550,943
[45] Date of Patent: Aug. 27, 1996

[54] UNITARY, DOUBLE-ENDED CONNECTOR FOR OPTICAL FIBRES

[75] Inventors: Håkan Elderstig, Bromma; Christian Vieider, Sollentuna, both of Sweden

[73] Assignee: Stiftelsen Institutet For Mikroelektronik, Kista, Sweden

[21] Appl. No.: 341,596

[22] PCT Filed: May 14, 1993

[86] PCT No.: PCT/SE93/00430

§ 371 Date: Nov. 21, 1994

§ 102(e) Date: Nov. 21, 1994

[87] PCT Pub. No.: WO93/23777

PCT Pub. Date: Nov. 25, 1993

[30] Foreign Application Priority Data

May 19, 1992 [SE] Sweden ................ 9201571

[51] Int. Cl.[6] .................................. G02B 6/38
[52] U.S. Cl. .................. 385/71; 385/59; 385/65; 385/83
[58] Field of Search ................. 385/59, 65, 71, 385/83, 49

[56] References Cited

U.S. PATENT DOCUMENTS

| | | | |
|---|---|---|---|
| 4,475,790 | 10/1984 | Little | 385/137 |
| 4,629,284 | 12/1986 | Malavieille | 385/70 |
| 4,830,456 | 5/1989 | Kakii et al. | 385/71 X |
| 4,836,638 | 6/1989 | Finzel | 385/65 X |
| 4,950,048 | 8/1990 | Kakii et al. | 385/83 |
| 5,146,522 | 9/1992 | Pavlath | 385/49 |

FOREIGN PATENT DOCUMENTS

| | | | |
|---|---|---|---|
| 3809037 | 9/1989 | Germany. | |
| 1-74511 | 3/1989 | Japan | 385/65 |
| 1-211703 | 8/1989 | Japan | 385/65 |
| 2-259609 | 10/1990 | Japan | 385/65 |
| WO86/02172 | 4/1986 | WIPO | 385/65 |

*Primary Examiner*—John D. Lee
*Attorney, Agent, or Firm*—Nies, Kurz, Bergert & Tamburro

[57] ABSTRACT

An optical fibre-connecting device includes a passageway which is funnel-shaped at both ends thereof and with which an optical fibre is intended to be inserted from either end into the passageway, so that the fibres will meet one another therein. The connecting device (1) includes a first silicon part (7) having a flat surface in which one or more grooves (8) of V-shaped cross-section have been etched. Additionally the connecting device (1) includes a second part (9) which is made of transparent glass and which has a flat side that is intended to abut the grooved surface of the first part (7) so as to form a channel of triangular cross-section, wherein a circle inscribed in the channel will have a diameter which is only slightly larger than the outer diameter of an optical fibre (5, 6).

11 Claims, 2 Drawing Sheets

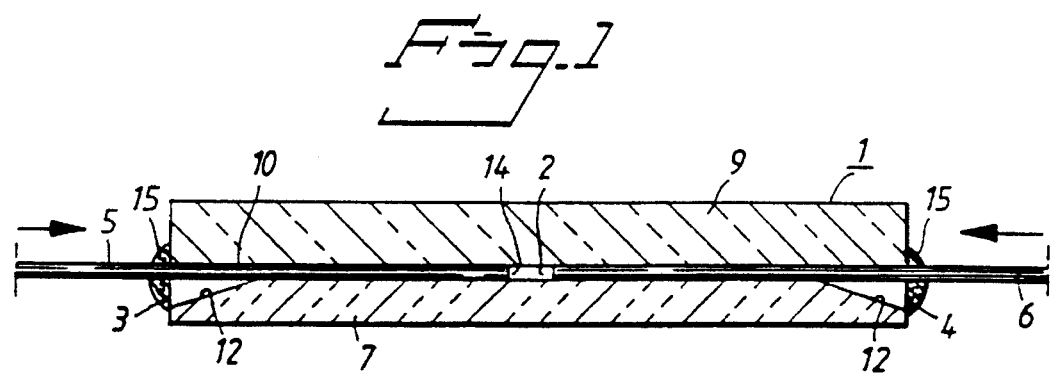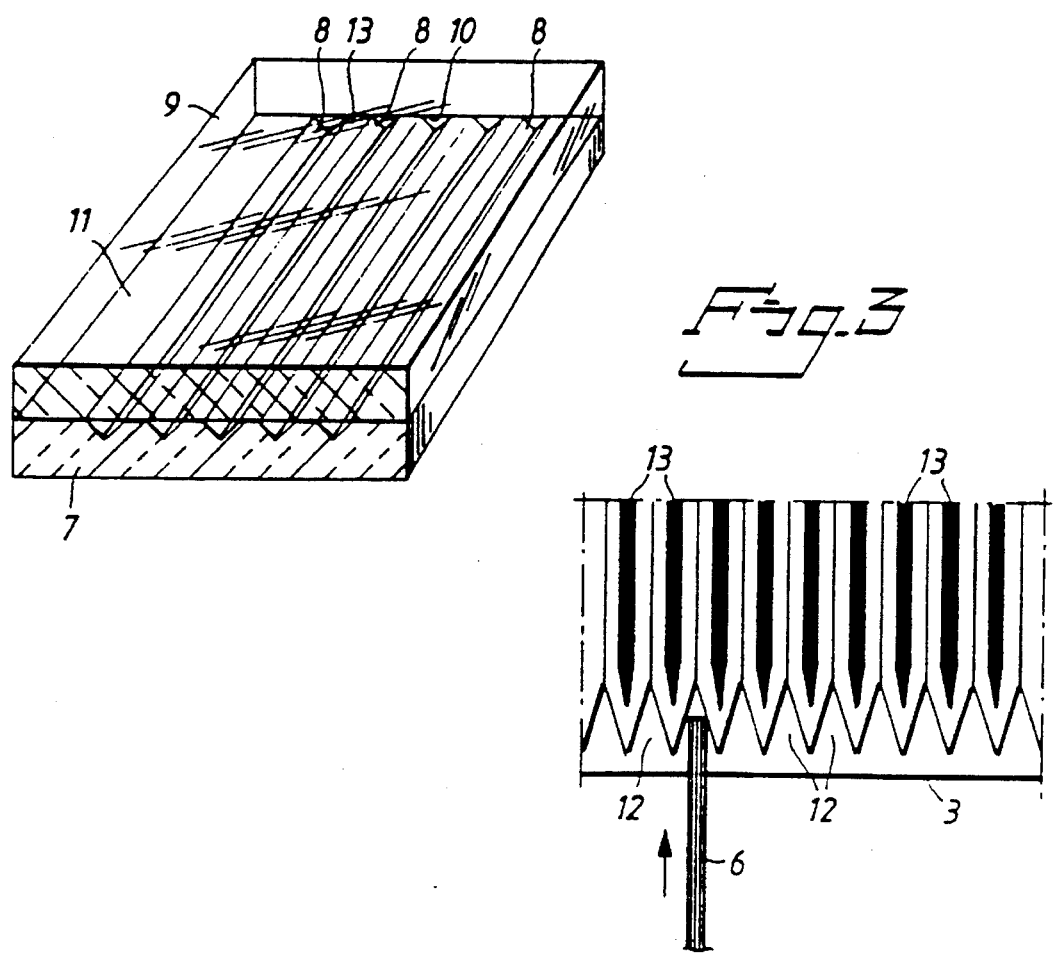

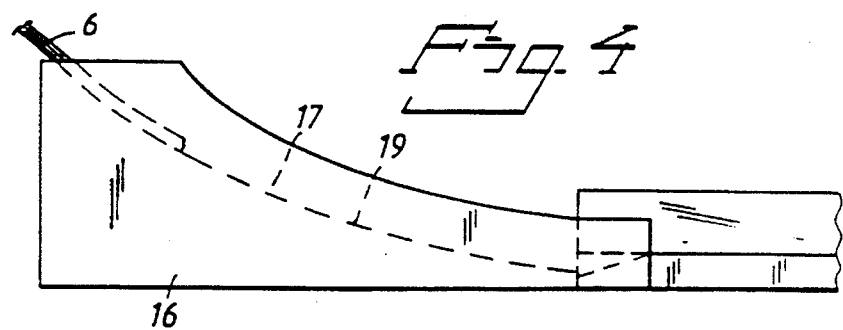
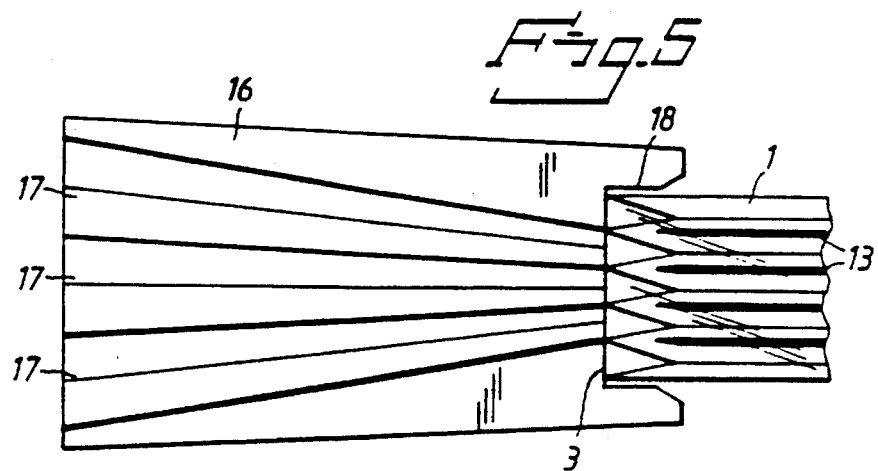
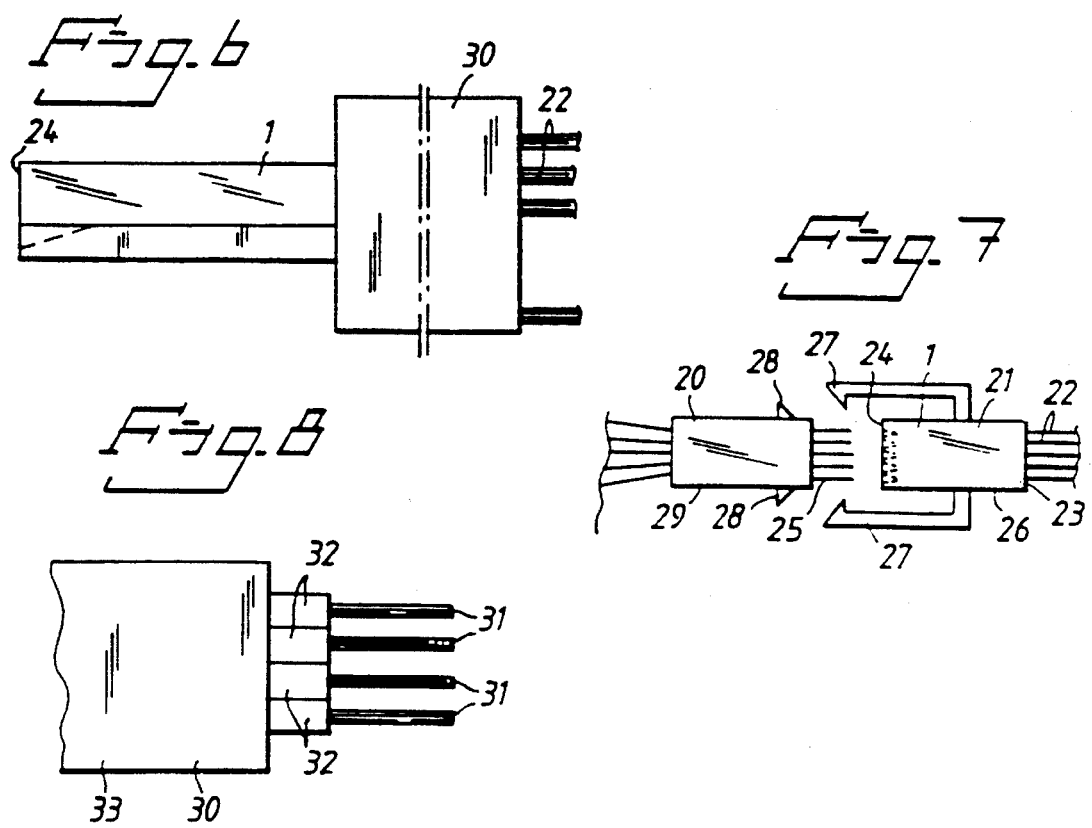

5,550,943

UNITARY, DOUBLE-ENDED CONNECTOR FOR OPTICAL FIBRES

BACKGROUND OF THE INVENTION

1. Field of the Invention

The present invention relates to a connecting device for optical fibres.

2. Description of the Related Art

When optical fibres are used as information carrying media, it is often necessary to join the fibres together and also to connect the fibres to light-transmitting and light-receiving units.

The present invention relates to a device for mutually connecting different kinds of fibres. Thus, the inventive connecting device can be used to join both plastic fibres and glass fibres.

A connecting device which is comprised essentially of an homogenous cylinder having a through-penetrating hole which extends along the cylinder axis is known to the art. At each end of the cylinder, there is provided a funnel-shaped recess which is symmetrical with respect to the cylinder axis and which leads to the throughpassing hole. The connecting device is made from a non-transparent material.

When using this known device, the ends of respective fibres are inserted into the funnel-shaped recess and then guided into the throughpassing hole, so as to meet one another within the device.

This known fibre-connecting device is expensive to manufacture and is encumbered with several decisive drawbacks. One drawback is that it is difficult to achieve sufficient precision with regard to the diameter of the throughpassing hole. The hole diameter should be precise to a tolerance of less than about 1 micrometer in order for the fibre ends to meet one another in the manner desired, i.e. with sufficient overlap of the fibre cores. Another drawback is that the connecting device is intended only for one single join. A further, serious drawback is that it is not possible to see or check the positions of the fibre ends in the fibre-connecting device.

These drawbacks are eliminated by means of the present invention, which provides a fibre-connecting device of high precision and of relatively inexpensive manufacture.

SUMMARY OF THE INVENTION

Accordingly, the present invention relates to an optical fibre-connecting device which includes a passageway which is funnel-shaped at both ends thereof and with which an optical fibre is intended to be inserted from either end into the passageway, so that the optical fibres will meet therein. The connecting device includes a first silicon part which has etched in one flat surface thereof one or more grooves of V-shaped cross-section. The connecting device includes a second part which is made of transparent glass and which has a flat side which is intended to lie against the grooved surface of said first part, so as to form a channel of triangular cross-section, where a circle inscribed in said channel will have a diameter which only slightly exceeds the outer diameter of an optical fibre.

BRIEF DESCRIPTION OF THE DRAWINGS

The invention will now be described in more detail with reference to the exemplifying embodiments thereof and also with reference to the accompanying drawings, in which FIG. 1 is a longitudinal sectional view of an inventive connecting device;

FIG. 2 is a perspective view of part of a connecting device;

FIG. 3 illustrates part of a connecting device according to FIG. 1 seen from above;

FIG. 4 is a side view of part of a connecting device and an adapter;

FIG. 5 illustrates the connecting device and adapter of FIG. 4 from above;

FIG. 6 illustrates an embodiment of the connecting device in which the device functions as a coupling unit;

FIG. 7 illustrates schematically a complete coupling unit which includes the connecting device; and FIG. 8 illustrates one end of a so-called ribbon.

DESCRIPTION OF THE PREFERRED EMBODIMENTS

FIG. 1 illustrates an optical fibre-connecting device 1 which includes a passageway 2 which is funnel-shaped at both ends 3, 4 thereof, where an optical fibre 5, 6 is intended to be inserted into the passageway from each end, as shown by the arrows, so that the optical fibres will meet in the passageway.

According to the invention, the connecting device includes a first silicon part 7 having a flat surface in which one or more grooves 8 of V-shaped cross-section have been etched. The connecting device also includes a second part 9, which is made of transparent glass material. The second part 9 has a flat side 10 which is intended to lie against the grooved surface 11 of the first part 7, such as to form a channel of triangular cross-section. A circle inscribed in this channel will have a diameter which only slightly exceeds the outer diameter of the optical fibre.

Each of the V-shaped grooves 8 at opposing ends 3, 4 of the connecting device has a deeper and broader section 12, such as to provide a funnel-shaped section at each said end 3, 4, as shown in FIGS. 1 and 3. FIG. 3 illustrates in dark, broad lines, the flat ridges 13 that extend between the V-shaped grooves 8.

According to one greatly preferred embodiment of the invention, the aforesaid first part of the connecting device is comprised of crystalline silicon having the crystal direction [1 0 0]. In practice, the first part of the connecting device is conveniently produced from a crystalline silicon plate having the crystal direction [1 0 0], a thickness of 525 micrometers and a diameter of 4 inches, i.e. a standard silicon sheet.

This choice of material will enable the grooves 8 to be wet-etched with the aid of a conventional photolithographic mask. The grooves are etched by applying a mask whose extension corresponds to the ridges 13. An anisotropic wet-etching process is then carried out, for instance with potassium hydroxide (KOH). The plate, or sheet, is etched to obtain the crystal plane [1 1 1]. The etching process is halted where these planes meet, V-shaped grooves having flat sides which define an angle of 54.7° with the upper surface of the plate being formed. The etching process is continued outside the mask, so as to form the funnel-shaped sections 12.

The aforedescribed method results in very high precision with regard to the dimensions and positions of the grooves 8.

According to another preferred embodiment, the second part 9 of the connecting device is comprised of silicate glass, preferably a boron silicate glass. Boron glass is preferred because it has generally the same coefficient of linear expansion as silicon. The glass will preferably have a thickness of about 0.5 millimeter.

After completion of the etching process, the flat undersurface of the second part 9 of the connecting device is placed on the first part 7. The parts 7, 9 are then joined together, preferably with the aid of an anodic bonding process. Bonding can be achieved by applying a voltage, e.g. a voltage of 800 Volts, vertically in FIG. 1, at a temperature of about 450° C.

The advantage of anodic bonding is that no glue need be used. When glue is used, there is a risk that glue may enter the grooves. Furthermore, it may be difficult to determine the thickness of glue joints, meaning that the cross-section of the grooves will not be well defined.

The grooves 8 thus have a cross-section in the shape of an isosceles triangle, into which the fibres are inserted.

Naturally, the precision to which the fibres are positioned in the groove will depend on how much smaller the outer diameter of the fibres is than the diameter of the circle inscribed in the groove. Ideally, the outer diameter of the fibre will coincide with the diameter of the inscribed circle. However, a certain degree of clearance must be found between fibre and groove, in order for it to be possible to insert the fibre into the groove.

A glass fibre which includes an optically conductive core will typically have an outer diameter of 125 micrometers. The optically conductive core has typically a diameter of 5 micrometers. The intention is that two fibre ends shall meet in the connecting device, as illustrated in FIG. 1, such that the cores will lie opposite one another. The cores should not be displaced radially in relation to one another by more than one micrometer.

According to one preferred embodiment, when the connecting device is intended to join together optical fibres that include an optically conductive core, the connecting device is so constructed that the outer diameter of the inscribed circle will exceed the outer diameter of the fibre by at most 25% of the core diameter, preferably by at most 10% of said core diameter.

When effecting a join, a so-called index matching liquid 14 is introduced into the passageway, by applying the liquid to one or both ends of the fibres prior to inserting the fibres into the connecting device. The index-matching liquid is a liquid which has the same refractive index as the core material. The index-matching liquid may be an oil, for instance. The skilled person is able to select an appropriate liquid according to the fibre material concerned. This liquid assists in maintaining low transition losses at the fibre join and also has a certain lubricating effect which facilitates insertion of the fibres into the connecting device.

Subsequent to having placed the fibres in the connecting device in the intended manner, glue 15 is applied to the ends of said device so as to fixate the fibres.

In the illustrated embodiment, each connecting device includes a number of grooves 8. It will be understood, however, that the connecting device can be constructed to include solely one single groove. When the device includes several grooves, a suitable groove spacing is 250 micrometers.

The inventive optical fibre-connecting device has three decisive advantages. Firstly, the device is extremely precise with regard to the dimensions and positions of the grooves. Secondly, and very importantly, the fibre ends can be seen through the glass. This can be achieved in-practice with the naked eye, without needing to use optical auxiliaries. This enables the positions of the fibres to be readily checked. Thirdly, the inventive optical fibre-connecting device can be manufactured cheaply. For instance, the silicon part of about 100 connecting devices can be produced simultaneously from a single silicon plate 4 inches in thickness.

The present invention therefore provides a significant advantage in comparison with known techniques.

According to one preferred embodiment, insertion of the fibres is facilitated by means of an adapter 16, shown in FIGS. 4 and 5, which is intended to lie against the ends 3, 4 of the connecting device 1 where the triangular channels open out, at least when inserting the fibres into said device. The adapter 16 includes a V-shaped groove 17 for each of the triangular channels 8 of the connecting device 1. The V-shaped adapter groove 17 widens and deepens in an outward direction away from the connecting device.

The adapter 16 may be made of a plastic material. The adapter 16 may also be provided with a recess 18 which connects with the connecting device 1, so as to enable the connecting device to be positioned more readily in relation to the adapter 16. Because the adapter groove widens in an outward direction away from the connecting device, a fibre 6 can be placed easily in a groove in the adapter. As the fibre is then pushed towards the connecting device the fibre will be guided into the actual connecting device by means of the adapter 16.

According to one preferred embodiment of the invention, the groove 17 in the adapter 16 is curved in the symmetry plane extending through the bottoms of respective V-shaped grooves, i.e. the adapter curves outwardly from the connecting device, as illustrated in FIG. 4. Reference numeral 19 identifies the bottom of a groove 17, which is shown to extend in a curved path.

The main reason, and an important reason, for this construction is that because the fibre is moved in a curved path the leading end of the fibre will be pressed against the bottom of the groove 8 in the connecting device. This means that the fibre will be positioned against the groove bottom when a gap is found between the outer surface of the fibre and the walls of the triangular groove. When the fibre introduced into the connecting device from the other end thereof is also inserted with the aid of the adapter, this fibre will also be positioned against the bottom of the groove in the connecting device. Thus, the two fibres will be well-positioned in relation to one another, even when the outer diameters of the fibres are smaller than the diameter of the inscribed circle to a greater extent than the diameter of the fibre cores. When using an adapter 16 with the aforesaid curved groove, glue 15 is applied so as to lock the fibre in position after having inserted the fibre into the connecting device.

The present invention can be applied to join single fibres or two or more fibres. The number of grooves included in a connecting device will therefore depend on the actual application of the device.

So-called fibre ribbons can also be connected. A so-called fibre ribbon 30 is a ribbon which contains a number of mutually parallel fibres 31. Each fibre is embedded in a cladding layer 32. The fibres are supported by a plastic casing 33; see FIG. 8.

FIG. 8 illustrates one end of a ribbon and shows part of the plastic casing peeled away and part of the cladding layers stripped-off.

When the distance between the grooves 8 is 250 micrometers, which corresponds to the distance between the fibres in the ribbon 30, all fibres can be joined at one and the same time, by introducing the end of the ribbon to a connecting device which has at least as many grooves as there are fibres in the ribbon.

In the aforegoing, the connecting device has been described solely with reference to its use in achieving a permanent fibre connection. According to one preferred embodiment, however, the connecting device may have the form of a coupling unit 20, 21, see FIGS. 6 and 7, with which one or more fibres 22 is/are inserted into the connecting device 1 from one side 23 thereof and fastened in relation to said device, and with which the other side 24 of the connecting device is intended to receive fibres 25 for insertion of said fibres into said device.

That side of the connecting device in which the fibres are permanently inserted may be moulded in a plastic holder 30; see FIG. 6.

The connecting device 1 may be embraced by a female part 26 of a conventional coupling unit, for instance a coupling unit of the kind used to connect together electrical conductors, see FIG. 7, said female part being provided with hooks 27 which coact with hooks 28 on a male part 29 of the coupling unit. In this case, the male part 29 carries fibres 25 which are spaced apart at a distance corresponding to the spacing of the grooves in the connecting device.

The coupling unit is preferably configured so that the male and female parts will include conventional guides (not shown) which function to bring the male part to a correct position in relation to the female part prior to said parts being pressed together and thus prior to the fibres 25 being led into the connecting device 1. According to one embodiment, the coupling unit is of a kind in which the female and male parts can be pushed together and mutually separated.

When concerning coupling units of this nature, it is advantageous to proceed from the aforesaid ribbon 30 which is provided with a male part 29.

It will be evident from the aforegoing that the present invention overcomes the drawbacks mentioned in the introduction and provides a highly advantageous connecting device.

The invention has been described in the aforegoing with reference to different exemplifying embodiments thereof. It will be understood, however, that the present invention can be varied with regard to dimensions and structural details.

The present invention shall not therefore be considered limited to the aforedescribed embodiments thereof, since modifications and variations can be made within the scope of the following claims.

We claim:

1. An optical fibre-connecting device for connecting a pair of optical fibres in coaxial relationship, said device comprising: a body member having a passageway which is funnel-shaped at both ends thereof and into which passageway an optical fibre is intended to be inserted from either end thereof, so that a pair of fibres inserted at respective opposite ends of the passageway will meet one another in the passageway, the body member including a first silicon part having a flat surface in which a groove of V-shaped cross-section has been etched and wherein the body member includes a second part covering said groove so that a channel with a triangular cross section is formed, wherein during said etching the V-shaped groove has been etched to a deeper and wider section at opposite ends of the body member so as to form a funnel-shaped section at each passageway end, wherein said second part is made from transparent glass material which has a flat side lying against the grooved surface of the first part to enable visual determination of fibre position within the passageway, and wherein the grooved surface of the first part and the flat side of the second part of the body member are joined together by means of an anodic bond whereby said channel of triangular cross-section is formed, wherein a circle inscribed in said channel will have a diameter which only slightly exceeds the outer diameter of the optical fibre.

2. A device according to claim 1, wherein when the connecting device is intended to mutually connect optical fibres that include a light conductive core, the outer diameter of said inscribed circle will exceed the outer diameter of the fibre by at most 25% of the core diameter.

3. A device according to claim 1, wherein the device includes at least two parallel, fibre-receiving grooves which together with said funnel-shaped section are made by etching.

4. A device according to claim 1, wherein the first part is made from crystalline silicon having the crystal direction; and wherein the second part is made from silicate glass.

5. A device according to claim 1, wherein the connecting device includes a fibre guide which is adapted to lie against an end of the connecting device adjacent a triangular channel when inserting a fibre into said connecting device; and wherein the fibre guide includes a V-shaped guide groove for each triangular channel of the connecting device, said V-shaped guide grooves widening and deepening in an outward direction away from the connecting device.

6. A device according to claim 5, wherein the guide grooves of said fibre guide curve in a symmetry plane that extends through bottom portions of respective V-shaped guide grooves.

7. A device according to claim 1, wherein the connecting device forms a coupling unit in which fibres are inserted into the connecting device from one side thereof and fastened in relation to the connecting device, and wherein an opposite side of the connecting device is adapted to receive additional fibres.

8. A device according to claim 1, wherein said first part is a silicon plate having a thickness of 525 micro-meters; and wherein said second part is a glass plate having a thickness of about 0.5 millimeter.

9. A device according to claim 3, wherein the fibre-receiving grooves have a mutual spacing of 250 micrometers.

10. A device according to claim 1, wherein when the connecting device is intended to mutually connect optical fibres that include a light conductive core, the outer diameter of said inscribed circle exceeds the outer diameter of the fibre by at most 10% of the core diameter.

11. A device according to claim 1, wherein the first part is made from crystalline silicon having the crystal direction; and wherein the second part is made from a boron silicate glass.

* * * * *